US012639861B2

(12) United States Patent
Edwards et al.

(10) Patent No.: US 12,639,861 B2
(45) Date of Patent: May 26, 2026

(54) GENERATING IMAGES BASED ON GENERATED CLUSTERS

(71) Applicant: Capital One Services, LLC, McLean, VA (US)

(72) Inventors: Joshua Edwards, Philadelphia, PA (US); Ermenildo Castro, McLean, VA (US); Benjamin Eng, Silver Spring, MD (US); Youbing Yin, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 138 days.

(21) Appl. No.: 18/355,399

(22) Filed: Jul. 19, 2023

(65) Prior Publication Data

US 2025/0029287 A1 Jan. 23, 2025

(51) Int. Cl.
*G06T 11/00* (2026.01)
*G06F 40/40* (2020.01)
(52) U.S. Cl.
CPC .............. *G06T 11/00* (2013.01); *G06F 40/40* (2020.01)
(58) Field of Classification Search
CPC ................................. G06T 11/00; G06F 40/40
See application file for complete search history.

(56) References Cited

U.S. PATENT DOCUMENTS

| | | | | |
|---|---|---|---|---|
| 9,489,580 | B2 * | 11/2016 | Laska | ................... G06V 10/235 |
| 2016/0292881 | A1 * | 10/2016 | Bose | ...................... G11B 27/10 |
| 2020/0235764 | A1 * | 7/2020 | Patton | ..................... G06F 16/29 |
| 2020/0314587 | A1 * | 10/2020 | Gurin | .................... H04W 4/029 |
| 2022/0188866 | A1 * | 6/2022 | Farmer | ................. G06Q 10/02 |
| 2023/0146144 | A1 * | 5/2023 | Garrett | .................... G06F 16/58 |
| | | | | 707/722 |
| 2024/0223592 | A1 * | 7/2024 | Bazalgette | .......... H04L 63/1425 |
| 2024/0362236 | A1 * | 10/2024 | St. Martin | ........ G06F 16/24578 |
| 2024/0419907 | A1 * | 12/2024 | Laprise | ................. G01C 21/34 |
| 2025/0029287 | A1 * | 1/2025 | Edwards | ................. G06F 40/40 |
| 2025/0054008 | A1 * | 2/2025 | Cella | ...................... G06N 5/043 |

* cited by examiner

*Primary Examiner* — Yu Chen
(74) *Attorney, Agent, or Firm* — Foley & Lardner LLP

(57) ABSTRACT

Methods and systems are described herein for generating images based on generated clusters. The system retrieves, from an account of a user, historic events associated with the user and determines clusters of the historic events based on location and time data associated with the historic events. The system generates an input for a machine learning model for a first cluster of historic events, where the machine learning model has been trained to generate images based on clusters of historic events. The system then inputs the input into the machine learning model to cause the machine learning model to output images depicting locations associated with the first cluster of historic events. The system outputs the images in conjunction with the first cluster of historic events.

20 Claims, 7 Drawing Sheets

100

200

| Events | Location | Date | Timestamp | Description |
|--------|----------|------|-----------|-------------|
| 203 | 206 | 209 | 212 | 215 |
| *<event_1>* | *<location_1>* | *<date_1>* | *<time_1>* | *<description_1>* |
| *<event_2>* | *<location_2>* | *<date_2>* | *<time_2>* | *<description_2>* |
| *<event_3>* | *<location_3>* | *<date_3>* | *<time_3>* | *<description_3>* |
| *<event_4>* | *<location_4>* | *<date_4>* | *<time_4>* | *<description_4>* |
| *<event_5>* | *<location_5>* | *<date_5>* | *<time_5>* | *<description_5>* |
| *<event_6>* | *<location_6>* | *<date_6>* | *<time_6>* | *<description_6>* |
| *<event_7>* | *<location_7>* | *<date_7>* | *<time_7>* | *<description_7>* |

| | | | |
|---|---|---|---|
| *<event_1>* | *<location_1>* | *<date_1>* | *<time_1>* |
| *<event_2>* | *<location_2>* | *<date_2>* | *<time_2>* |
| *<event_4>* | *<location_4>* | *<date_4>* | *<time_4>* |
| *<event_5>* | *<location_5>* | *<date_5>* | *<time_5>* |
| *<event_6>* | *<location_6>* | *<date_6>* | *<time_6>* |

406

| | | | |
|---|---|---|---|
| *<event_3>* | *<location_3>* | *<date_3>* | *<time_3>* |
| *<event_7>* | *<location_7>* | *<date_7>* | *<time_7>* |

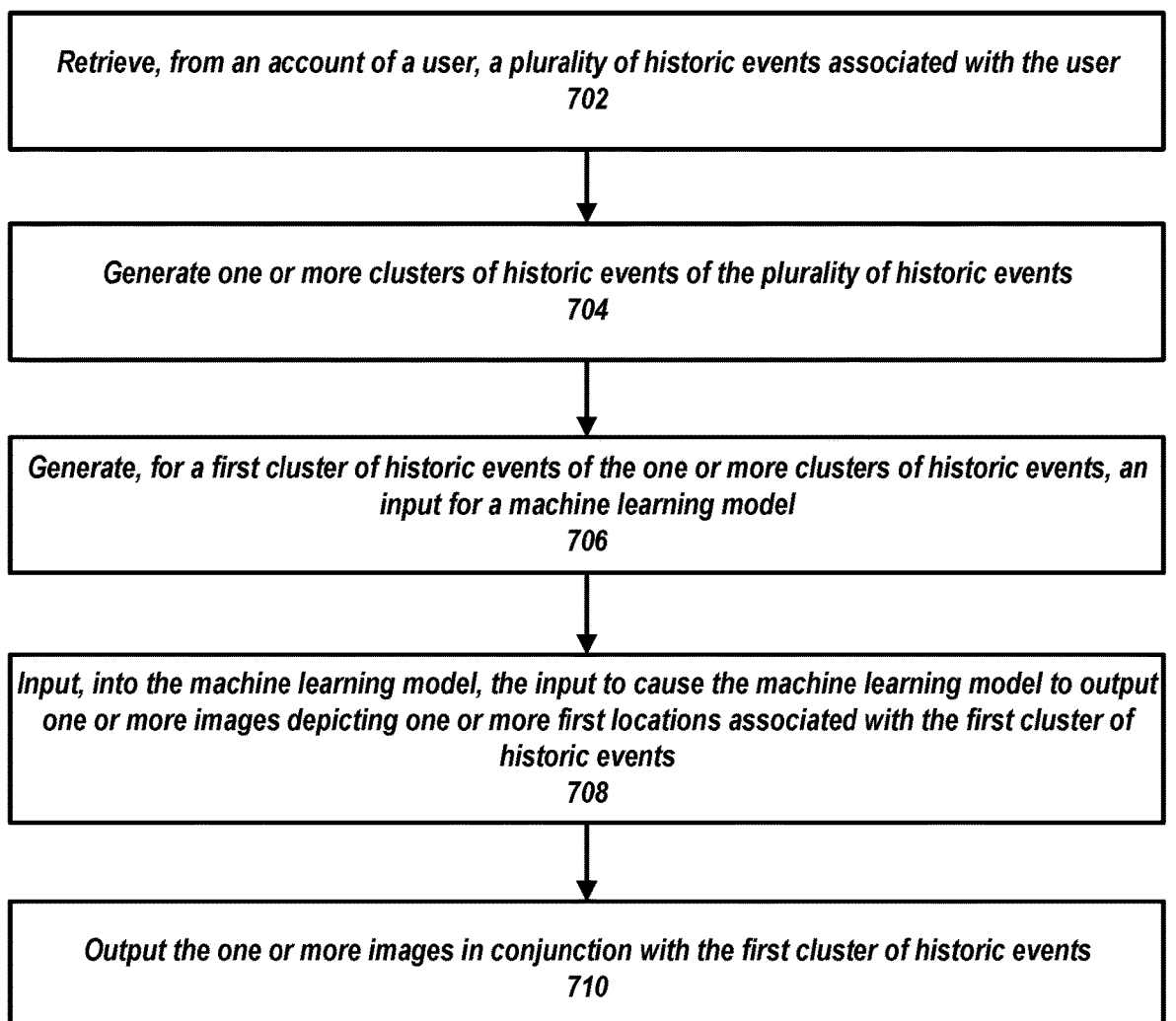

Retrieve, from an account of a user, a plurality of historic events associated with the user
702

Generate one or more clusters of historic events of the plurality of historic events
704

Generate, for a first cluster of historic events of the one or more clusters of historic events, an input for a machine learning model
706

Input, into the machine learning model, the input to cause the machine learning model to output one or more images depicting one or more first locations associated with the first cluster of historic events
708

Output the one or more images in conjunction with the first cluster of historic events
710

FIG. 7

GENERATING IMAGES BASED ON GENERATED CLUSTERS

BACKGROUND

Records of historic events often include important information for users. However, this important information can be difficult to decipher from the records. Records may be labeled with titles that lack intuitive meaning or connection to the historic events, for example, using code or shorthand that is difficult to understand. Furthermore, it can be difficult for individuals reviewing the records to identify when certain records are related to each other. These difficulties prevent users from interpreting the records and verifying that they are not fraudulent. Initial attempts to solve this problem have included the addition of descriptions to records of the historic events. However, these descriptions often lack clarity and do not provide the necessary context to the records. Thus, a mechanism is desired for identifying clusters of related historic events and generating images based on the clusters of historic events.

SUMMARY

Methods and systems are described herein for generating images based on generated clusters of historic events. An image generation system may be built and configured to perform operations discussed herein. The image generation system may retrieve information relating to historic events associated with the user. Historic events may be records of a user's visits to various locations. As an example, the user may have traveled to Paris on vacation and may have visited a number of locations around Paris. In some embodiments, each historic event may be a record of a visit to a location in Paris. The information about each historic event may include location and timestamp information. Based on certain historic events occurring within the same area or around the same time, the image generation system may cluster those historic events together. Each cluster therefore includes historic events that are somehow related to each other. The image generation system may assign a level of importance to each cluster, for example, based on personal information of the user. In some embodiments, the image generation system may assign the importance based on comparing the personal information with the locations and timestamps of each cluster. For clusters meeting a threshold level of importance, the image generation system may generate an input for a machine learning model. The input may include a first cluster and associated information as well as the personal information about the user. The input may include a prompt to cause the machine learning model to output an image depicting locations associated with the first cluster. The machine learning model may then output the image in conjunction with the first cluster of historic events.

In particular, the image generation system may retrieve, from an account of a user, personal information and historic events associated with the user. Each historic event may include a location where the event took place and a timestamp when the event took place. For example, the image generation system may retrieve personal information including a home or work location of the user and a schedule of the user, as well as historic events that occurred within a certain time frame, such as the past month.

The image generation system may determine one or more clusters of the historic events. Each cluster may include historic events that are somehow related to each other. The image generation system may determine the clusters based on some of the locations being within a threshold distance of each other and some of the timestamps being within a threshold time of each other. For example, the image generation system may determine that five historic events occurred within a mile of the Eiffel Tower between the hours of 5 to 7 p.m. The image generation system may thus cluster these five historic events together.

The image generation system may assign a level of importance to each cluster. For example, the image generation system may assign the importance level based on comparing the personal information associated with the user with locations and timestamps associated with each cluster of historic events. For example, the image generation system may assign a higher level of importance to clusters that occurred farther from the user's home or work. As another example, the image generation system may assign a higher level of importance to clusters that occurred within the user's vacation time, according to the user's schedule. The image generation system may determine characteristics of each cluster and may assign the level of importance based on the characteristics. In some embodiments, if the image generation system determines that a cluster's characteristics vary from typical characteristics associated with a user's historic events, the image generation system may assign a higher level of importance to the cluster. For example, a cluster of historic events may be associated with categories such as dining out and entertainment, whereas the user's historic events are typically associated with categories such as groceries and gas stations. The image generation system may thus assign a higher level of importance to the cluster.

In some embodiments, in response to determining that a level of importance for a cluster of historic events meets a threshold importance level, the image generation system may generate an input for a machine learning model. The input may include the cluster of historic events, locations and timestamps associated with the cluster, and the personal information associated with the user. The input may include a prompt to cause the machine learning model to output an image depicting the locations associated with the cluster. For example, the input may include instructions such as "generate an image of the Eiffel Tower from the point of view of Girafe Restaurant at sunset."

The image generation system may input the input into the machine learning model. The machine learning model may have been trained to generate images based on clusters of historic events. The input may cause the machine learning model to output images depicting the locations associated with the cluster. For example, the machine learning model may output an image of the Eiffel Tower from the perspective of Girafe Restaurant at sunset. The image generation system may then output the generated image along with the cluster of historic events. For example, the image generation system may include the image with a listing of the historic events included in the cluster.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 illustrates a data structure of historic events, in accordance with one or more embodiments.

FIG. 4 illustrates data structures of clusters of historic events, in accordance with one or more embodiments.

FIG. 7 shows a flowchart of the process for generating images based on generated clusters of historic events, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
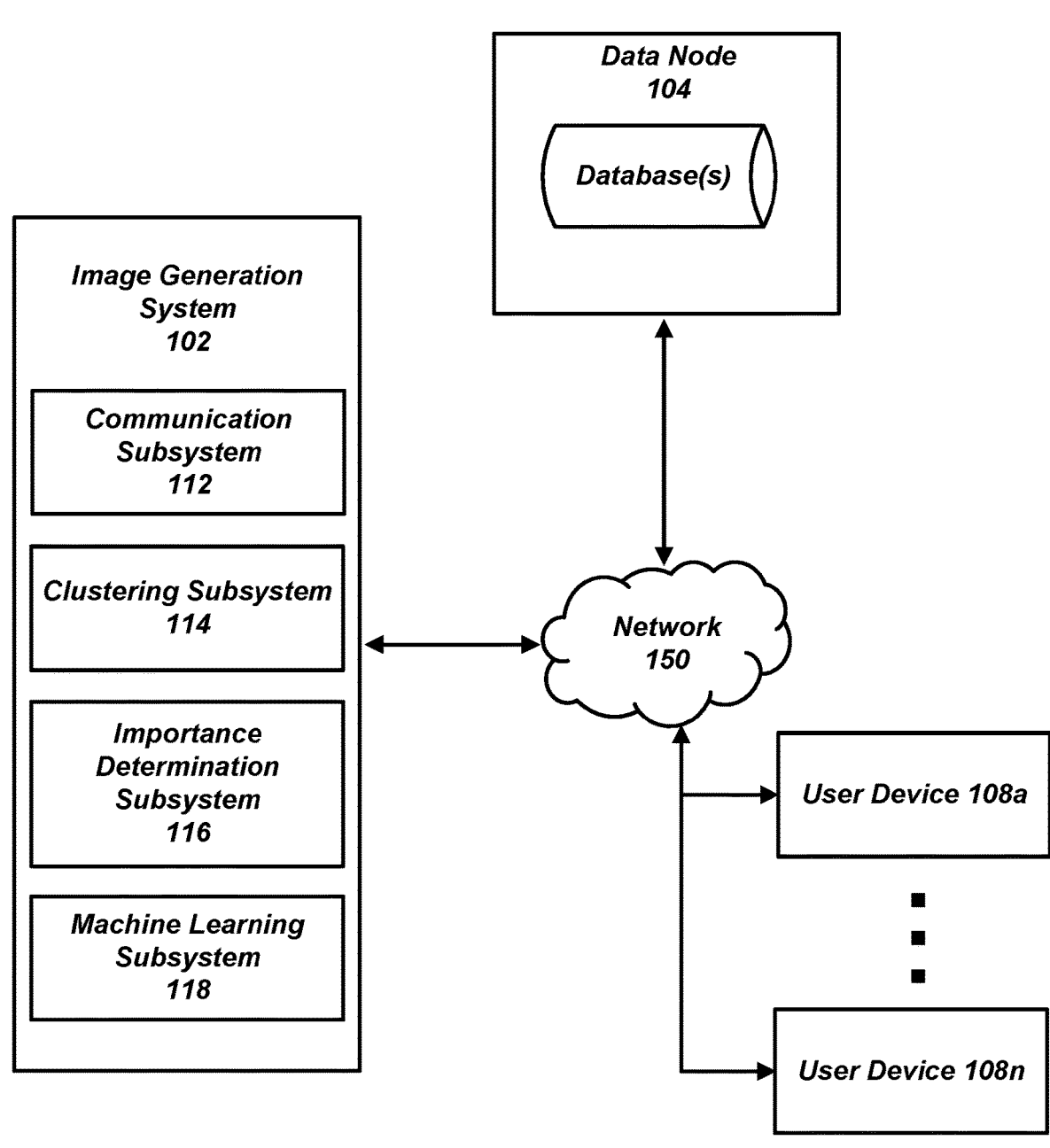
FIG. 1 shows an illustrative system for generating images based on generated clusters of historic events, in accordance with one or more embodiments.

FIG. 1 shows an illustrative system 100 for generating images based on generated clusters of historic events, in accordance with one or more embodiments. System 100 may include image generation system 102, data node 104, and user devices 108a-108n. Image generation system 102 may include communication subsystem 112, clustering subsystem 114, importance determination subsystem 116, machine learning subsystem 118, and/or other subsystems. In some embodiments, only one user device may be used, while in other embodiments, multiple user devices may be used. The user devices 108a-108n may be associated with one or more users. The user devices 108a-108n may be associated with one or more user accounts. In some embodiments, user devices 108a-108n may be computing devices that may receive and send data via network 150. User devices 108a-108n may be end-user computing devices (e.g., desktop computers, laptops, electronic tablets, smartphones, and/or other computing devices used by end users). User devices 108a-108n may output (e.g., via a graphical user interface) run applications, output communications, receive inputs, or perform other actions.

Image generation system 102 may execute instructions for generating images based on generated clusters of historic events. Image generation system 102 may include software, hardware, or a combination of the two. For example, communication subsystem 112 may include a network card (e.g., a wireless network card and/or a wired network card) that is associated with software to drive the card. In some embodiments, image generation system 102 may be a physical server or a virtual server that is running on a physical computer system. In some embodiments, image generation system 102 may be configured on a user device (e.g., a laptop computer, a smart phone, a desktop computer, an electronic tablet, or another suitable user device).

Data node 104 may store various data, including one or more machine learning models, training data, communications, and/or other suitable data. In some embodiments, data node 104 may also be used to train machine learning models. Data node 104 may include software, hardware, or a combination of the two. For example, data node 104 may be a physical server, or a virtual server that is running on a physical computer system. In some embodiments, image generation system 102 and data node 104 may reside on the same hardware and/or the same virtual server/computing device. Network 150 may be a local area network, a wide area network (e.g., the internet), or a combination of the two.

Image generation system 102 (e.g., communication subsystem 112) may retrieve, from an account of a user, personal information associated with the user. The personal information may include a home location of the user, a work location of the user, a schedule of the user, and other personal information. Communication subsystem 112 may also retrieve a plurality of historic events associated with the user. Each historic event may be a record of a user at a location. In some embodiments, communication subsystem 112 may detect historic events by retrieving a transaction history associated with the user from a database. Historic events may include records of activities, meetings, transactions, payments, exchanges, or other events that have occurred in the past. Each historic event may be associated with a corresponding location where each historic event took place and a corresponding timestamp when each historic event took place. As an example, the image generation system may retrieve a home or work location of the user and a schedule of the user, as well as historic events that occurred within a certain time frame, such as the past month.

FIG. 2 illustrates a data structure 200 of historic events, in accordance with one or more embodiments. In some embodiments, data structure 200 may be a subset of a larger data structure of historic events. Data structure 200 may include historic events 203, where each entry of data structure 200 is a record of a historic event. In some embodiments, historic events 203 may include records of activities, meetings, transactions, payments, exchanges, or other events that have occurred in the past. Historic events 203 may be labeled with descriptive titles or with code or shorthand identifying each event. Data structure 200 may also include locations 206 associated with the events, dates 209 associated with the events, timestamps 212 associated with the events, and descriptions 215 associated with the timestamps. In some embodiments, locations 206 may include addresses, coordinates, postal codes, place names (e.g., Eiffel Tower), or other forms of locations. In some embodiments, dates 209 and timestamps 212 may include dates, days of the week, times of day, periods of time (e.g., sunset), relative times (e.g., one hour ago), or other forms of time. In some embodiments, descriptions 215 may include metadata or other descriptive information relating to historic events 203. In some embodiments, historic events 203 may be illustrated on one or more maps.

Returning to FIG. 1, image generation system 102 (e.g., clustering subsystem 114) may determine one or more clusters of historic events. Clusters may be groups of historic events that have one or more similarities to each other or one or more dissimilarities to other clusters. For example, clustering subsystem 114 may determine the clusters based on corresponding locations being within a threshold distance of each other and corresponding timestamps being within a threshold time of each other. For example, if certain historic events occurred close to each other in distance or time, clustering subsystem 114 may determine that those historic events are in a cluster. In some embodiments, clustering subsystem 114 may determine clusters based on other relationships between historic events. For example, multiple historic events may be related by a theme or category, such as "shopping day downtown," "birthday night," "Christmas shopping," or other theme or category. In some embodiments, a cluster of historic events may be related in other ways.

In some embodiments, a cluster of historic events may be related to a main event. For example, a ticket to a baseball game may be a main event with which other historic events are associated. Related events may include concessions purchases, a check at a restaurant, a purchase at a team clothing store, and other related events. The ticket may be clustered together with the related purchases even if the ticket was purchased at a distant time or location from the related purchases. In some embodiments, a cluster of historic events may be related to a landmark location, such as the Eiffel Tower. Clustering subsystem 114 may identify the landmark location associated with the first cluster of historic events. For example, clustering subsystem 114 may identify the landmark location based on a proximity of the landmark location to corresponding locations where historic events of the first cluster took place. Clustering subsystem 114 may also identify the landmark location based on a relation between the landmark location and the corresponding locations where historic events of the first cluster took place. As described above, the relation may be a common theme or category. In some embodiments, the relation may be a connection to the landmark location. For example, related historic events may include a coffee purchase near the Eiffel Tower, shopping at a gift shop, dinner at a restaurant overlooking the Eiffel Tower, and other related events. In some embodiments, a cluster of historic events may be related to a main event or landmark location in other ways.

Figure 3:
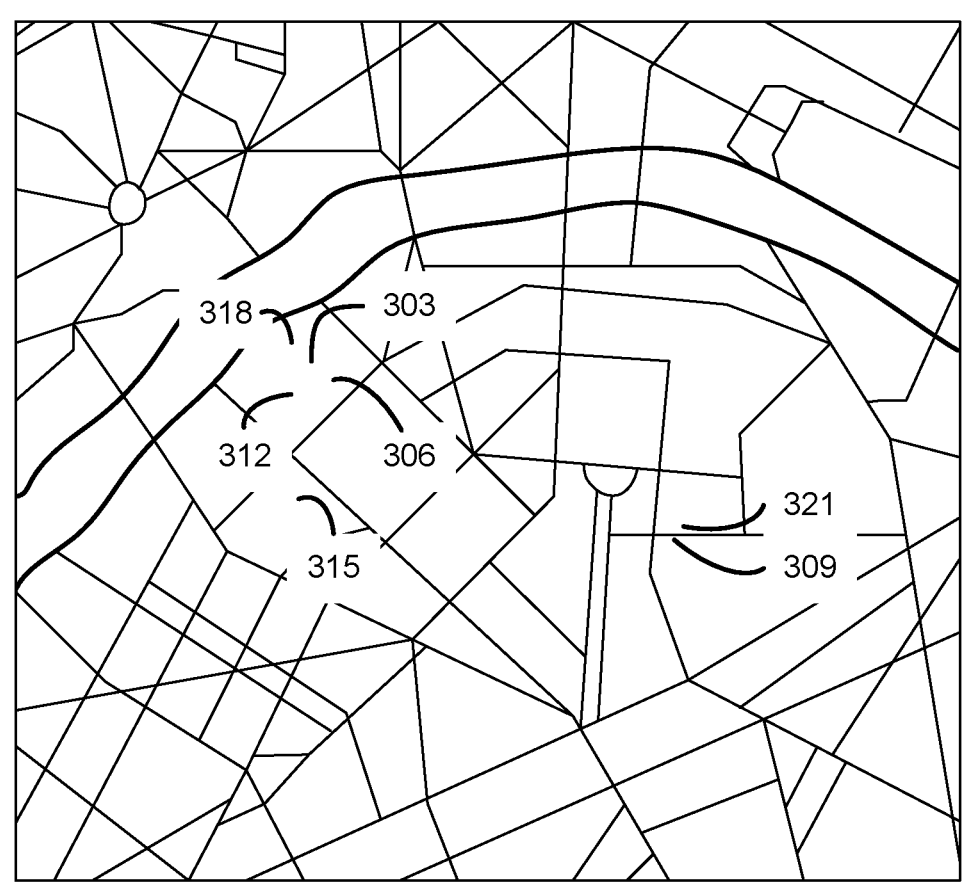
FIG. 3 illustrates a map of locations associated with historic events, in accordance with one or more embodiments.

FIG. 3 illustrates a map 300 of locations associated with historic events, in accordance with one or more embodiments. For example, the locations shown in map 300 may correspond to locations 206, as shown in FIG. 2. In some embodiments, map 300 may be a subset of a larger map or one of multiple maps associated with historic events of an account. In some embodiments, image generation system 102 may generate a map for one or more clusters of historic events. Map 300 may include historic event 303, historic event 306, historic event 309, historic event 312, historic event 315, historic event 318, historic event 321, or other historic events. In some embodiments, certain historic events may be related to one another. Relations between historic events may be based on proximity of time or location to each other. For example, as shown in FIG. 3, historic event 303, historic event 306, historic event 312, historic event 315, and historic event 318 may form a first cluster based on these historic events occurring within a close proximity of each other, in time or location or both. In some embodiments, these events may form a cluster based on proximity of each event to a landmark location (e.g., the Eiffel Tower). In some embodiments, these events may form a cluster based on a relation, such as a theme or category, between the events. As an example, a theme may be "Eiffel Tower," "shopping in Paris," "afternoon with family," or another theme. Categories may include "retail," "sightseeing," "tourist," "entertainment," "restaurants," or other categories. In some embodiments, historic event 309 and historic event 321 may form a second cluster using criteria described herein or other criteria.

In some embodiments, determining the one or more clusters of historic events may involve machine learning subsystem 118 inputting the historic events into an unsupervised categorization model to receive the one or more clusters of historic events as an output. For example, the unsupervised categorization model may generate the clusters by identifying patterns or similarities in the historic events without predefined labels or categories. To generate the clusters, machine learning subsystem 118 may transform the historic event data into a numerical representation, normalize or standardize the features, or address any missing values or outliers. Machine learning subsystem 118 may select or extract relevant features from the data to capture the underlying patterns. Machine learning subsystem 118 may select a similarity or dissimilarity measure to quantify the distance or similarity between data points. The metric may include Euclidean distance, Manhattan distance, cosine similarity, or another domain-specific measure. Machine learning subsystem 118 may then select a clustering model, for example, based on the characteristics of the historic event data and the desired outcomes. Different models may utilize different assumptions and techniques for identifying clusters.

FIG. 4 illustrates data structure 403 and data structure 406 of clusters of historic events, in accordance with one or more embodiments. In some embodiments, data structure 403 may be a first cluster of historic events and data structure 406 may be a second cluster of historic events. In some embodiments, the historic events in the first cluster (e.g., data structure 403) may correspond to historic event 303, historic event 306, historic event 312, historic event 315, and historic event 318, as shown in FIG. 3. For example, clustering subsystem 114 may form the first cluster based on these historic events occurring within a close proximity of each other, in time or location or both. In some embodiments, these events may form a cluster based on proximity of each event to a landmark location (e.g., the Eiffel Tower). In some embodiments, these events may form a cluster based on a relation, such as a theme or category, between the events. In some embodiments, the historic events in the second cluster (e.g., data structure 406) may correspond to historic event 309 and historic event 321, as shown in FIG. 3. Clustering subsystem 114 may form the second cluster using criteria described herein or other criteria.

In some embodiments, image generation system 102 (e.g., importance determination subsystem 116) may assign a level of importance to each cluster of historic events. In some embodiments, the level of importance may indicate noteworthiness of the historic events within the cluster. In some embodiments, the level of importance may indicate a likelihood that a visual indication of the cluster will be helpful or appreciated by the user. In some embodiments, importance determination subsystem 116 may assign the importance based on comparing the personal information associated with the user with locations associated with each cluster of historic events and timestamps associated with each cluster of historic events. For example, the personal information may include a home location of the user, a work location of the user, a schedule of the user, and other personal information. Comparing the personal information with the locations or timestamps of a cluster may reveal how close to work or how close to home the events occurred, schedule categories associated with the timestamps (e.g., "errands" or "vacation"), or other information. In some embodiments, the schedule may include flight or hotel information for vacations or work travel, reservation bookings, ticket information, work meetings, or other information. In some embodiments, importance determination subsystem 116 may determine any events coinciding with or in close proximity to the timestamps of the cluster and may compare the cluster with those events. In some embodiments, personal information may include accounts associated with the user. For example, importance determination subsystem 116 may retrieve emails (e.g., booking confirmations) associated with an account of the user and may compare the clusters with information included in the emails. In some embodiments, personal information may include profiles, text messages, or other data associated with the user. In some embodiments, importance determination subsystem 116 may access external sources for additional information relevant to the clusters. For example, importance determination subsystem 116 may scrape data from travel, recommendation, and review websites, communicate with third-party application programming interfaces (APIs), or retrieve data from other external sources. Comparing the personal information with the clusters may reveal how noteworthy the cluster is for the user. For example, a day of shopping while the user is on vacation may have a high level of importance while a day of shopping near the user's home may have a low level of importance.

In some embodiments, importance determination subsystem 116 may determine one or more characteristics of each cluster of historic events and may assign the level of importance to each cluster based on the characteristics of each cluster. For example, certain characteristics may increase the level of importance while others may decrease the level of importance. In some embodiments, characteristics associated with noteworthiness may increase the level of importance while characteristics associated with ordinariness may decrease the level of importance.

In some embodiments, characteristics of each cluster may include an average distance between a location associated with the user and corresponding locations where historic events within each cluster took place. For example, importance determination subsystem 116 may compare the home or work location of the user (e.g., based on the personal information) to the location of each historic event in the cluster. If the average distance of the cluster from the user's work or home is small, this characteristic may indicate lower importance. For example, a cluster of events occurring in close proximity to the user's work may indicate a work lunch or errands after work. If the average distance of the cluster from the user's work or home is large, this characteristic may indicate higher importance. For example, a cluster of events occurring far from the user's home may indicate a special occasion.

In some embodiments, characteristics of each cluster may include a rate of occurrence of historic events within each cluster. For example, importance determination subsystem 116 may determine how many historic events in the cluster occurred within a certain time period. Importance determination subsystem 116 may compare this rate to an average rate of historic events according to the personal information. For example, if importance determination subsystem 116 determines that the historic events in a cluster occurred at a significantly different rate than the average rate, importance determination subsystem 116 may increase or decrease the level of importance. In some embodiments, a higher rate may indicate a higher level of importance, because a higher rate of spending may be associated with a special occasion, such as a shopping day. In some embodiments, a higher rate may indicate a lower level of importance, as a higher rate of spending may be associated with ordinary activities, such as errands. In some embodiments, a lower rate may indicate a higher level of importance, because a lower rate of spending may be associated with a noteworthy occasion, such as a vacation. In some embodiments, a lower rate of spending may indicate a lower level of importance, as a lower rate of spending may be associated with ordinary activities such as house chores. In some embodiments, importance determination subsystem 116 may consider this characteristic in conjunction with other characteristics to determine the level of importance.

In some embodiments, characteristics of each cluster may include one or more themes or categories associated with each cluster. For example, certain categories or themes may indicate noteworthiness or ordinariness. Themes such as "vacation," "birthday," or "family time" or categories such as "restaurants," "entertainment," or "recreation" may indicate noteworthiness. In contrast, themes such as "errands" or "commuting" or categories such as "gas station" or "drug store" may indicate ordinariness. In some embodiments, importance determination subsystem 116 may assign certain levels of importance to each theme or category, and when a given cluster is associated with that particular theme or category, importance determination subsystem 116 may adjust the level of importance of the cluster accordingly (e.g., either by assigning the same importance to the cluster or by increasing or decreasing the level of importance of the cluster).

In some embodiments, importance determination subsystem 116 may compare categories associated with historic events within each cluster with typical categories associated with the user according to the personal information. In some embodiments, typical categories may include events that have occurred one or more times within a recent time period. In some embodiments, categories that do not typically occur for historic events of the user may indicate importance. As an example, if typical categories include grocery stores, a cluster that includes a restaurant category may indicate importance (e.g., dining out). As another example, if typical categories include restaurants, a cluster that includes a grocery store category may indicate importance (e.g., hosting a dinner party).

In some embodiments, importance determination subsystem 116 may identify an additional historic event relating to the cluster of historic events. In some embodiments, the additional historic event may not be included in the cluster of historic events. For example, the additional event may be separated in time or location from the cluster but may be otherwise related. For example, as shown in FIGS. 3 and 4, a first cluster of historic events may include five historic events that occurred in close proximity to the Eiffel Tower within a certain time period. Importance determination subsystem 116 may identify an additional event such as an online ticket purchase from several months before the time period of the first cluster. The event may include a ticket purchase to visit the top of the Eiffel Tower. Importance determination subsystem 116 may then determine a characteristic of the cluster (e.g., such as any of the characteristics discussed herein) based on the additional historic event. For example, importance determination subsystem 116 may rely on the additional historic event when determining any of the characteristics discussed herein for the cluster.

In some embodiments, importance determination subsystem 116 may determine a threshold importance level. The threshold importance level may be a minimum importance level for generating visuals for a cluster. For example, the threshold importance level may represent the minimum noteworthiness for generating a visual for a cluster. In some embodiments, in response to determining that a first level of importance for a first cluster meets the threshold importance level, machine learning subsystem 118 may generate an input for a machine learning model. The input may include the first cluster of historic events, corresponding locations associated with the first cluster, corresponding timestamps associated with the first cluster, and the personal information associated with the user.

In some embodiments, the input may include a prompt for generating one or more images based on the first cluster of historic events using the corresponding locations, the corresponding timestamps, and the personal information associated with the user. The input may include a prompt to cause the machine learning model to output an image depicting the locations associated with the cluster. For example, the input may include instructions such as "generate an image of the Eiffel Tower from the point of view of Girafe Restaurant at sunset." In some embodiments, each historic event may include a height relative to ground level where the historic event took place. For example, a dinner at Girafe Restaurant may occur on a rooftop terrace several stories up from ground level. The input may thus include a height relative to ground level as additional location information. In some embodiments, the input may include an instruction to generate recommendations. For example, a prompt may include "generate an image of things to do with family near the Eiffel Tower."

Machine learning subsystem 118 may input, into the machine learning model trained to generate images based on clusters of historic events, the input. This may cause the machine learning model to output one or more images depicting locations associated with the first cluster of historic events. For example, the machine learning model may output one or more images of the Eiffel Tower from the point of view of Girafe Restaurant at sunset.

In some embodiments, inputting, into the machine learning model, the input may cause communication subsystem 112 to retrieve one or more related images relating to the first cluster of historic events. For example, communication subsystem 112 may retrieve the related images based on metadata associated with the related images and one or more characteristics of the first cluster. For example, communication subsystem 112 may scrape data from travel, recommendation, and review websites, communicate with third-party APIs, or retrieve data from other external sources. As previously discussed, importance determination subsystem 116 may determine one or more characteristics of the first cluster, and communication subsystem 112 may then retrieve the related images based on comparing the characteristics with the metadata. For example, the characteristics may include categories of flower shops and chocolate shops. Communication subsystem 112 may then retrieve images of roses and a chocolate box. Machine learning subsystem 118 may incorporate these images into the input to the machine learning model. In some embodiments, the machine learning model may incorporate or compile the related images into an output (e.g., as a collage, photo album, new image generated from the related images, or other compilation).

In some embodiments, inputting, into the machine learning model, the input may cause communication subsystem 112 to retrieve, from the account of the user, personal information associated with the user. The personal information may include one or more user images, and the machine learning model may retrieve the user images from the personal information. Machine learning subsystem 118 may then input the user images into the machine learning model with a prompt to incorporate the user images into the one or more images. For example, the prompt may include "generate an image of the Eiffel Tower from the point of view of this couple celebrating an anniversary dinner at Girafe Restaurant at sunset." In some embodiments, the prompt may include "generate an image of this family doing tourist activities near the Eiffel Tower."

Image generation system 102 (e.g., machine learning subsystem 118) may include or manage one or more machine learning models. For example, one or more machine learning models may be trained to generate predictions for entries based on corresponding features. In some embodiments, one or more machine learning models may further output feature impact parameters associated with predictions. Machine learning subsystem 118 may include software components, hardware components, or a combination of both. For example, machine learning subsystem 118 may include software components (e.g., API calls) that access one or more machine learning models. Machine learning subsystem 118 may access training data, for example, in memory. In some embodiments, machine learning subsystem 118 may access the training data on data node 104 or on user devices 108a-108n. In some embodiments, the training data may include entries with corresponding features and corresponding output labels for the entries. In some embodiments, machine learning subsystem 118 may access one or more machine learning models. For example, machine learning subsystem 118 may access the machine learning models on data node 104 or on user devices 108a-108n.

In some embodiments, machine learning subsystem 118 may include a large language model. The large language model may have been trained using unsupervised learning on a massive amount of text data. The large language model may be trained on publicly available text from the internet. The large language model may learn to predict the next word in a sentence based on the preceding context using statistical patterns and relationships within the text data. The large language model may also be trained using supervised learning to train the large language model on a more focused dataset with specific labeled examples for the desired task. The large language model may thus learn to adapt its knowledge and language understanding to a specific task, resulting in improved performance and task-specific capabilities. In some embodiments, machine learning subsystem 118 may include an image generation model. The image generation model may have been trained using large datasets of images. The training process may involve feeding images into the image generation model and optimizing the image generation model's parameters to learn the underlying patterns and features present in the data. In some embodiments, the image generation model may be trained to encode important features of the training images and decode them to generate realistic images. The image generation model may iteratively produce images until the generated images are sufficiently realistic. In some embodiments, machine learning subsystem 118 may include a combination of large language models, image generation models, and other types of models.

Figure 5:
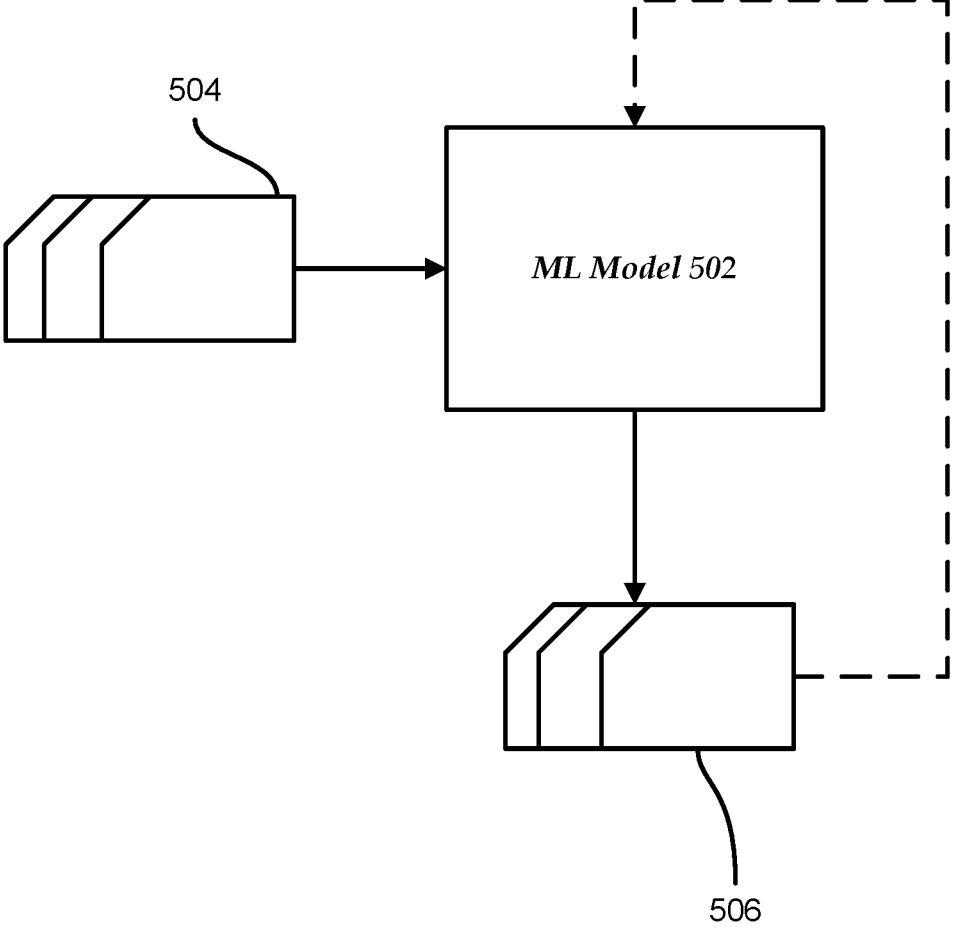
FIG. 5 illustrates an exemplary machine learning model, in accordance with one or more embodiments.

FIG. 5 illustrates an exemplary machine learning model 502, in accordance with one or more embodiments. In some embodiments, machine learning model 502 may be included in machine learning subsystem 118 or may be associated with machine learning subsystem 118. Machine learning model 502 may take input 504 (e.g., text prompts) and may generate outputs 506 (e.g., generated images). The output parameters may be fed back to the machine learning model as inputs to train the machine learning model (e.g., alone or in conjunction with user indications of the accuracy of outputs, labels associated with the inputs, or other reference feedback information). The machine learning model may update its configurations (e.g., weights, biases, or other parameters) based on the assessment of its prediction (e.g., of an information source) and reference feedback informa-tion (e.g., user indication of accuracy, reference labels, or other information). Connection weights may be adjusted, for example, if the machine learning model is a neural network, to reconcile differences between the neural network's pre-diction and the reference feedback. One or more neurons of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the machine learning model may be trained to generate better predictions of information sources that are responsive to a query.

In some embodiments, the machine learning model may include an artificial neural network. In such embodiments, the machine learning model may include an input layer and one or more hidden layers. Each neural unit of the machine learning model may be connected to one or more other neural units of the machine learning model. Such connec-tions may be enforcing or inhibitory in their effect on the activation state of connected neural units. Each individual neural unit may have a summation function, which com-bines the values of all of its inputs together. Each connection (or the neural unit itself) may have a threshold function that a signal must surpass before it propagates to other neural units. The machine learning model may be self-learning and/or trained, rather than explicitly programmed, and may perform significantly better in certain areas of problem solving, as compared to computer programs that do not use machine learning. During training, an output layer of the machine learning model may correspond to a classification of machine learning model, and an input known to corre-spond to that classification may be input into an input layer of the machine learning model during training. During testing, an input without a known classification may be input into the input layer, and a determined classification may be output.

A machine learning model may include embedding layers in which each feature of a vector is converted into a dense vector representation. These dense vector representations for each feature may be pooled at one or more subsequent layers to convert the set of embedding vectors into a single vector.

In some embodiments, communication subsystem 112 may output the one or more images to the user (e.g., via user devices 108a-108n). In some embodiments, communication subsystem 112 may output the images in conjunction with the first cluster of historic events. For example, communi-cation subsystem 112 may generate the images for display along with a listing of the historic events of the first cluster within an account of the user. For example, communication subsystem 112 may display the images with a subset of a transaction history associated with the user, such as relevant credit card transactions associated with an account of the user. In some embodiments, communication subsystem 112 may output a notification to the user (e.g., via user devices 108a-108n) that the one or more images are available to view. In some embodiments, communication subsystem 112 may incorporate the one or more images into recommenda-tions for the user and may output the recommendations to the user (e.g., via user devices 108a-108n). For example, the images may portray activities for families to do in Paris, and communication subsystem 112 may output the images with a listing of activities for families to do in Paris. In some embodiments, communication subsystem 112 may output the images in additional contexts.

Computing Environment

Figure 6:
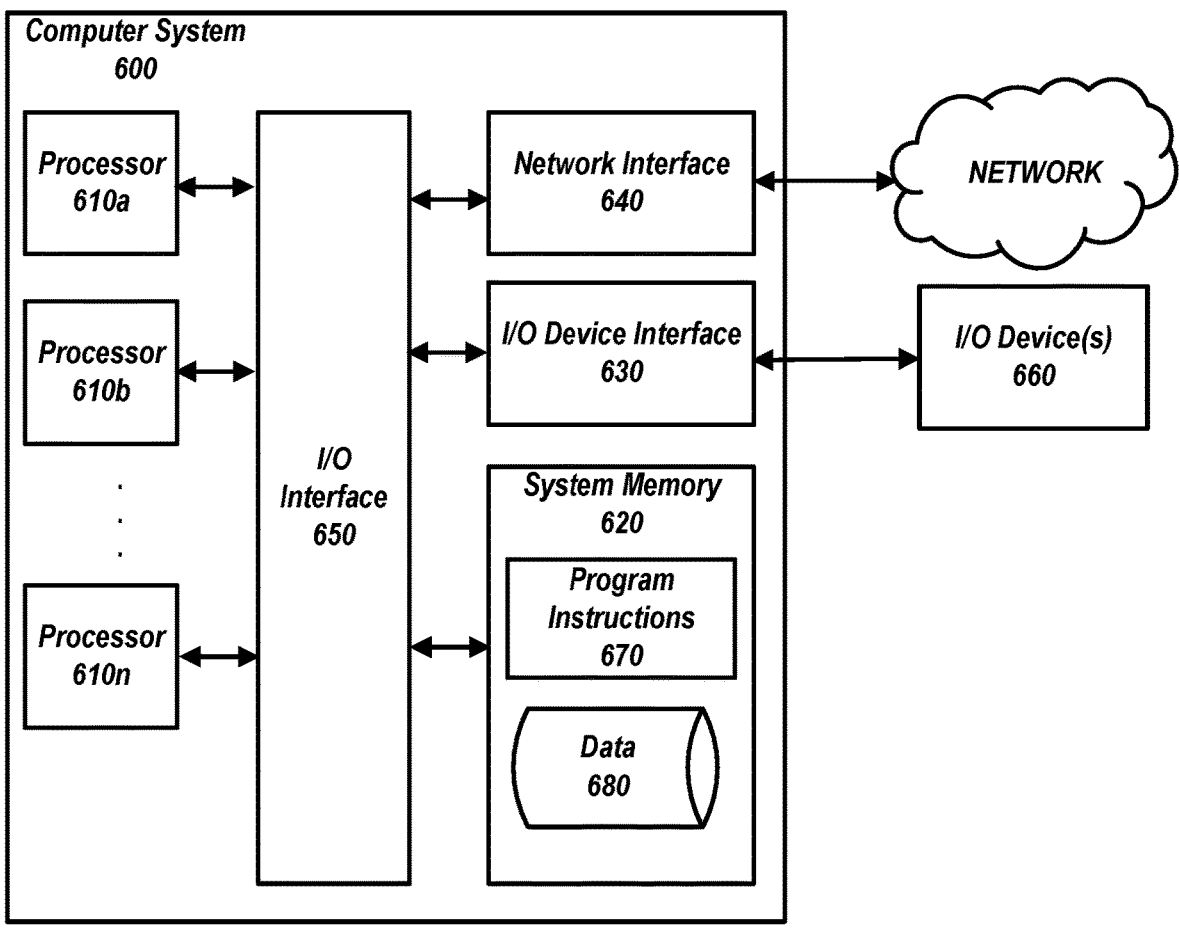
FIG. 6 illustrates a computing device, in accordance with one or more embodiments.

FIG. 6 shows an example computing system 600 that may be used in accordance with some embodiments of this disclosure. A person skilled in the art would understand that those terms may be used interchangeably. The components of FIG. 6 may be used to perform some or all operations discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more proces-sors (e.g., processors 610a-610n) coupled to system memory 620, an input/output (I/O) device interface 630, and a network interface 640 via an I/O interface 650. A processor may include a single processor, or a plurality of processors (e.g., distributed processors). A processor may be any suit-able processor capable of executing or otherwise performing instructions. A processor may include a central processing unit (CPU) that carries out program instructions to perform the arithmetical, logical, and input/output operations of computing system 600. A processor may execute code (e.g., processor firmware, a protocol stack, a database manage-ment system, an operating system, or a combination thereof) that creates an execution environment for program instruc-tions. A processor may include a programmable processor. A processor may include general or special purpose micropro-cessors. A processor may receive instructions and data from a memory (e.g., system memory 620). Computing system 600 may be a uni-processor system including one processor (e.g., processor 610a), or a multi-processor system including any number of suitable processors (e.g., 610a-610n). Mul-tiple processors may be employed to provide for parallel or sequential execution of one or more portions of the tech-niques described herein. Processes, such as logic flows, described herein may be performed by one or more pro-grammable processors executing one or more computer programs to perform functions by operating on input data and generating corresponding output. Processes described herein may be performed by, and apparatus can also be implemented as, special purpose logic circuitry, for example., an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computing system 600. I/O devices may include devices that receive input (e.g., from a user) or output information (e.g., to a user). I/O devices 660 may include, for example, a graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speak-ers, microphones, cameras, or the like. I/O devices 660 may be connected to computing system 600 through a wired or wireless connection. I/O devices 660 may be connected to computing system 600 from a remote location. I/O devices

660 located on remote computer systems, for example, may be connected to computing system 600 via a network and network interface 640.

Network interface 640 may include a network adapter that provides for connection of computing system 600 to a network. Network interface 640 may facilitate data exchange between computing system 600 and other devices connected to the network. Network interface 640 may support wired or wireless communication. The network may include an electronic communication network, such as the Internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory computer-readable storage medium. A non-transitory computer-readable storage medium may include a machine-readable storage device, a machine-readable storage substrate, a memory device, or any combination thereof. A non-transitory computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 600, or multiple computer systems 600 configured to host different portions or instances of embodiments. Multiple computer systems 600 may provide for parallel or sequential processing/execution of one or more portions of the techniques described herein.

Those skilled in the art will appreciate that computing system 600 is merely illustrative, and is not intended to limit the scope of the techniques described herein. Computing system 600 may include any combination of devices or software that may perform or otherwise provide for the performance of the techniques described herein. For example, computing system 600 may include or be a combination of a cloud-computing system, a data center, a server rack, a server, a virtual server, a desktop computer, a laptop computer, a tablet computer, a server device, a user device, a mobile telephone, a personal digital assistant (PDA), a mobile audio or video player, a game console, a vehicle-mounted computer, a Global Positioning System (GPS), or the like. Computing system 600 may also be connected to other devices that are not illustrated, or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Operation Flow

FIG. 7 shows a flowchart of the process 700 for updating machine learning models using weights based on features contributing to predictions, in accordance with one or more embodiments. For example, the system may use process 700 (e.g., as implemented on one or more system components described above) to assign weights based on a number of features contributing to a given prediction and to update the model accordingly.

At 702, image generation system 102 (e.g., using one or more of processors 610a-610n) may retrieve, from an account of a user, a plurality of historic events associated with the user. Image generation system 102 may also retrieve information associated with the historic events, such as a corresponding location where each historic event took place and a corresponding timestamp when each historic event took place. Image generation system 102 may retrieve the historic events from system memory 620, via the network, or elsewhere.

At 704, image generation system 102 (e.g., using one or more of processors 610a-610n) may generate one or more clusters of historic events. Image generation system 102 may generate the clusters based on corresponding locations being within a threshold distance of each other and corresponding timestamps being within a threshold time of each other. In some embodiments, image generation system 102 may generate the clusters using one or more of processors 610a-610n.

At 706, image generation system 102 (e.g., using one or more of processors 610a-610n) may generate, for a first cluster of historic events, an input for a machine learning model. The input may include the first cluster of historic events, a first subset of corresponding locations, a first subset of corresponding timestamps, and personal information associated with the user. In some embodiments, image generation system 102 may retrieve the sparsity threshold from system memory 620, via the network, or elsewhere.

At 708, image generation system 102 (e.g., using one or more of processors 610*a*-610*n*) may input the input into the machine learning model. The input may cause the machine learning model to output one or more images depicting one or more first locations associated with the first cluster of historic events. In some embodiments, image generation system 102 may input, into the machine learning model, the input using one or more of processors 610*a*-610*n*.

At 710, image generation system 102 (e.g., using one or more of processors 610*a*-610*n*) may output the one or more images in conjunction with the first cluster of historic events. In some embodiments, image generation system 102 may input the updated dataset into the machine learning model using one or more of processors 610*a*-610*n*.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising retrieving, from an account of a user, a plurality of historic events associated with the user, wherein each historic event comprises one or more of a corresponding location where each historic event took place and a corresponding timestamp, determining, based on a plurality of corresponding locations being within a threshold distance of each other and a plurality of corresponding timestamps being within a threshold time of each other, one or more clusters of historic events of the plurality of historic events, generating, for a first cluster of historic events of the one or more clusters of historic events, an input for a machine learning model, inputting, into the machine learning model, the input to cause the machine learning model to output one or more images depicting one or more first locations associated with the first cluster of historic events, wherein the machine learning model has been trained to generate images based on clusters of historic events, and outputting the one or more images in conjunction with the first cluster of historic events.

2. The method of any one of the preceding embodiments, further comprising retrieving, from the account of the user, personal information associated with the user, wherein the personal information comprises one or more of a home location of the user, a work location of the user, and a schedule of the user, assigning, based on comparing the personal information associated with the user with one or more locations associated with each cluster of historic events and one or more timestamps associated with each cluster of historic events, a level of importance to each cluster of historic events of the one or more clusters of historic events, and generating the input for the machine learning model in response to determining that a first level of importance for the first cluster of historic events meets a threshold importance level.

3. The method of any one of the preceding embodiments, wherein assigning the level of importance comprises determining one or more characteristics of each cluster of historic events, and assigning the level of importance to each cluster of historic events based on the one or more characteristics of each cluster of historic events, wherein a first subset of the one or more characteristics increases the level of importance while a second subset of the one or more characteristics decreases the level of importance.

4. The method of any one of the preceding embodiments, wherein the one or more characteristics of each cluster of historic events comprise an average distance between the home location of the user and corresponding locations where historic events within each cluster of historic events took place.

5. The method of any one of the preceding embodiments, wherein the one or more characteristics of each cluster of historic events comprise a rate of historic events within each cluster of historic events relative to an average rate of historic events according to the personal information.

6. The method of any one of the preceding embodiments, wherein the one or more characteristics of each cluster of historic events comprise categories associated with historic events within each cluster of historic events in comparison with typical categories associated with the user according to the personal information, wherein the typical categories comprise events that have occurred one or more times within a recent time period.

7. The method of any one of the preceding embodiments, wherein determining the one or more characteristics of each cluster of historic events comprises, for a cluster of historic events: identifying an additional historic event relating to the cluster of historic events, wherein the additional historic event is not included in the cluster of historic events, and determining a characteristic of the cluster of historic events based on the additional historic event.

8. The method of any one of the preceding embodiments, wherein determining the one or more clusters of historic events comprises inputting the plurality of historic events into an unsupervised categorization model to receive the one or more clusters of historic events as an output.

9. The method of any one of the preceding embodiments, wherein the input comprises a prompt for generating the one or more images based on the first cluster of historic events using a first subset of corresponding locations, a first subset of corresponding timestamps, and personal information associated with the user.

10. The method of any one of the preceding embodiments, further comprising identifying a landmark location associated with the first cluster of historic events based on one or more of a proximity of the landmark location to corresponding locations where historic events of the first cluster of historic events took place and a relation between the landmark location and the corresponding locations where historic events of the first cluster of historic events took place.

11. The method of any one of the preceding embodiments, wherein each historic event further comprises a height relative to ground level where the historic event took place, and wherein the input comprises the height relative to the ground level.

12. The method of any one of the preceding embodiments, wherein inputting, into the machine learning model, the input to cause the machine learning model to output the one or more images comprises causing the machine learning model to retrieve one or more related images relating to the first cluster of historic events based on metadata associated with the one or more related images and one or more characteristics of the first cluster of historic events.

13. The method of any one of the preceding embodiments, wherein inputting, into the machine learning model, the input to cause the machine learning model to output the one or more images further comprises causing the machine learning model to compile the one or more related images relating to the first cluster of historic events into the one or more images.

14. The method of any one of the preceding embodiments, wherein inputting, into the machine learning model, the input to cause the machine learning model to output the one or more images further comprises causing the machine learning model to retrieve, from the account of the user, personal information associated with the user, retrieve, from the personal information, one or more user images, and input the one or more user images into the machine learning model with a prompt to incorporate the one or more user images into the one or more images.

15. The method of any one of the preceding embodiments, wherein outputting the one or more images in conjunction with the first cluster of historic events comprises generating the one or more images for display in the account of the user with a listing of historic events within the first cluster of historic events.

16. A tangible, non-transitory, machine-readable medium storing instructions that, when executed by a data processing apparatus, cause the data processing apparatus to perform operations comprising those of any of embodiments 1-15.

17. A system comprising one or more processors and memory storing instructions that, when executed by the processors, cause the processors to effectuate operations comprising those of any of embodiments 1-15.

18. A system comprising means for performing any of embodiments 1-15.

19. A system comprising cloud-based circuitry for performing any of embodiments 1-15.

What is claimed is:

1. A system for generating images based on generated clusters, the system comprising:

one or more processors, at least one memory, and computer-readable media having computer-executable instructions stored thereon, the computer-executable instructions, when executed by the one or more processors, causing the system to perform operations comprising:

retrieving, from an account of a user, personal information associated with the user and a plurality of historic events associated with the user;

determining, based on a plurality of corresponding locations being within a threshold distance of each other and a plurality of corresponding timestamps being within a threshold time of each other, one or more clusters of historic events of the plurality of historic events;

comparing a rate of occurrence of historic events in a first cluster of historic events, of the one or more clusters of historic events, occurring within a time period relative to an average rate of occurrence of historic events according to the personal information;

assigning, based on comparing the rate of occurrence of historic events in the first cluster of historic events to the average rate of occurrence historic events, a level of importance to the first cluster of historic events;

in response to determining that the level of importance meets a threshold importance level, generating an input for a machine learning model, the input comprising the first cluster of historic events, a first subset of the plurality of corresponding locations, a first subset of a plurality of corresponding transactions, a first subset of the one or more plurality of corresponding timestamps, and the personal information associated with the user;

inputting, into the machine learning model, the input to cause the machine learning model to output one or more images depicting one or more activities corresponding to one or more first transactions associated with one or more first locations associated with the first cluster of historic events, wherein the machine learning model has been trained to generate images based on clusters of historic events; and outputting the one or more images in conjunction with the first cluster of historic events.

2. A method comprising:

retrieving, from an account of a user, personal information associated with the user and a plurality of historic events associated with the user;

determining, based on a plurality of corresponding locations being within a threshold distance of each other and a plurality of corresponding timestamps being within a threshold time of each other, one or more clusters of historic events of the plurality of historic events;

comparing a rate of occurrence of historic events in a first cluster of historic events, of the one or more clusters of historic events, occurring within a time period relative to an average rate of occurrence of historic events according to the personal information;

assigning, based on comparing the rate of occurrence of historic events in the first cluster of historic events to the average rate of occurrence historic events, a level of importance to the first cluster of historic events;

in response to determining that the level of importance meets a threshold importance level, generating, for the first cluster of historic events, an input for a machine learning model;

inputting, into the machine learning model, the input to cause the machine learning model to output one or more images depicting one or more activities corresponding to one or more transactions associated with one or more first locations associated with the first cluster of historic events, wherein the machine learning model has been trained to generate images based on clusters of historic events; and outputting the one or more images in conjunction with the first cluster of historic events.

3. The method of claim 2, wherein the personal information identifies one or more of a home location of the user, a work location of the user, a schedule of the user, account of the user, a text message of the user, and a profile of the user, and wherein assigning the level of importance comprises:

assigning, based on comparing the rate of occurrence of historic events in the first cluster of historic events to the average rate of occurrence historic events, based on comparing the personal information associated with the user with one or more locations associated with the first cluster of historic events and one or more timestamps associated with the first cluster of historic events, the level of importance to the first cluster of historic events.

4. The method of claim 2, wherein the personal information identifies one or more of a home location of the user, a work location of the user, a schedule of the user, the account of the user, a text message of the user, and a profile of the user, and wherein assigning the level of importance comprises:

determining one or more characteristics of the first cluster of historic events; and assigning the level of importance to the first cluster of historic events based on the one or more characteristics of the first cluster of historic events, wherein a first subset of the one or more characteristics increases the level of importance while a second subset of the one or more characteristics decreases the level of importance.

5. The method of claim 4, wherein the one or more characteristics comprise an average distance between the home location of the user and corresponding locations where historic events within each cluster of historic events took place.

6. The method of claim 4, wherein the one or more characteristics comprise a rate of occurrence of historic events within each cluster of historic events relative to the average rate of occurrence of historic events according to the personal information.

7. The method of claim 4, wherein the one or more characteristics comprise categories associated with historic events within each cluster of historic events in comparison with typical categories associated with the user according to the personal information, wherein the typical categories comprise events that have occurred one or more times within a recent time period.

8. The method of claim 7, wherein determining the one or more characteristics comprises, for a cluster of historic events:

identifying an additional historic event relating to the cluster of historic events, wherein the additional historic event is not included in the cluster of historic events and the additional historic event occurs at a location that is different from locations where historic events within the cluster of historic events took place; and determining a characteristic of the cluster of historic events based on the additional historic event.

9. The method of claim 2, wherein determining the one or more clusters of historic events comprises inputting the plurality of historic events into an unsupervised categorization model to receive the one or more clusters of historic events as an output.

10. The method of claim 2, wherein the input comprises a prompt for generating the one or more images based on the first cluster of historic events using a first subset of corresponding locations, a first subset of corresponding timestamps, and the personal information associated with the user.

11. The method of claim 2, further comprising identifying a landmark location associated with the first cluster of historic events based on one or more of a proximity of the landmark location to corresponding locations where historic events of the first cluster of historic events took place and a relation between the landmark location and the corresponding locations where historic events of the first cluster of historic events took place.

12. The method of claim 11, wherein each historic event further comprises a height relative to ground level where the historic event took place, and wherein the input comprises the height relative to the ground level.

13. The method of claim 2, wherein inputting, into the machine learning model, the input to cause the machine learning model to output the one or more images comprises causing the machine learning model to retrieve one or more related images relating to the first cluster of historic events based on metadata associated with the one or more related images and one or more characteristics of the first cluster of historic events.

14. The method of claim 13, wherein inputting, into the machine learning model, the input to cause the machine learning model to output the one or more images further comprises causing the machine learning model to compile the one or more related images relating to the first cluster of historic events into the one or more images.

15. The method of claim 13, wherein inputting, into the machine learning model, the input to cause the machine learning model to output the one or more images further comprises causing the machine learning model to:

retrieve, from the personal information, one or more user images; and input the one or more user images into the machine learning model with a prompt to incorporate the one or more user images into the one or more images.

16. The method of claim 2, wherein outputting the one or more images in conjunction with the first cluster of historic events comprises generating the one or more images for display in the account of the user with a listing of historic events within the first cluster of historic events.

17. One or more non-transitory, computer-readable media storing instructions that, when executed by one or more processors, cause operations comprising:

retrieving, from an account of a user, personal information associated with the user and a plurality of historic events associated with the user;

determining, based on a plurality of corresponding locations being within a threshold distance of each other and a plurality of corresponding timestamps being within a threshold time of each other, one or more clusters of historic events of the plurality of historic events;

comparing a rate of occurrence of historic events in a first cluster of historic events, of the one or more clusters of historic events, occurring within a time period relative to an average rate of occurrence of historic events according to the personal information;

assigning, based on comparing the rate of occurrence of historic events in the first cluster of historic events to the average rate of occurrence historic events, a level of importance to the first cluster of historic events;

in response to determining that the level of importance meets a threshold importance level, generating, for the first cluster of historic events, an input for a machine learning model;

inputting, into the machine learning model, the input to cause the machine learning model to output one or more images depicting one or more activities corresponding to one or more transactions associated with one or more first locations associated with the first cluster of historic events, wherein the machine learning model has been trained to generate images based on clusters of historic events; and outputting the one or more images in conjunction with the first cluster of historic events.

18. The one or more non-transitory, computer-readable media of claim 17, wherein the personal information identifies one or more of a home location of the user, a work location of the user, a schedule of the user, the account of the user, a text message of the user, and a profile of the user, and wherein assigning the level of importance comprises:

assigning, based on comparing the rate of occurrence of historic events in the first cluster of historic events to the average rate of occurrence historic events, based on comparing the personal information associated with the user with one or more locations associated with the first cluster of historic events and one or more timestamps associated with the first cluster of historic events, the level of importance to the first cluster of historic events.

19. The one or more non-transitory, computer-readable media of claim 17, wherein the personal information identifies one or more of a home location of the user, a work location of the user, a schedule of the user, the account of the user, a text message of the user, and a profile of the user, and wherein assigning the level of importance comprises:

determining one or more characteristics of the first cluster of historic events; and assigning the level of importance to the first cluster of historic events based on the one or more characteristics of the first cluster of historic events, wherein a first subset of the one or more characteristics increases the level of importance while a second subset of the one or more characteristics decreases the level of importance.

20. The one or more non-transitory, computer-readable media of claim 17, wherein determining the one or more clusters of historic events comprises inputting the plurality of historic events into an unsupervised categorization model to receive the one or more clusters of historic events as an output.

* * * * *